No. 766,748. PATENTED AUG. 2, 1904.
A. C. VAUCLAIN.
TEMPLET FOR DRILLING MACHINES.
APPLICATION FILED NOV. 2, 1903.
NO MODEL.
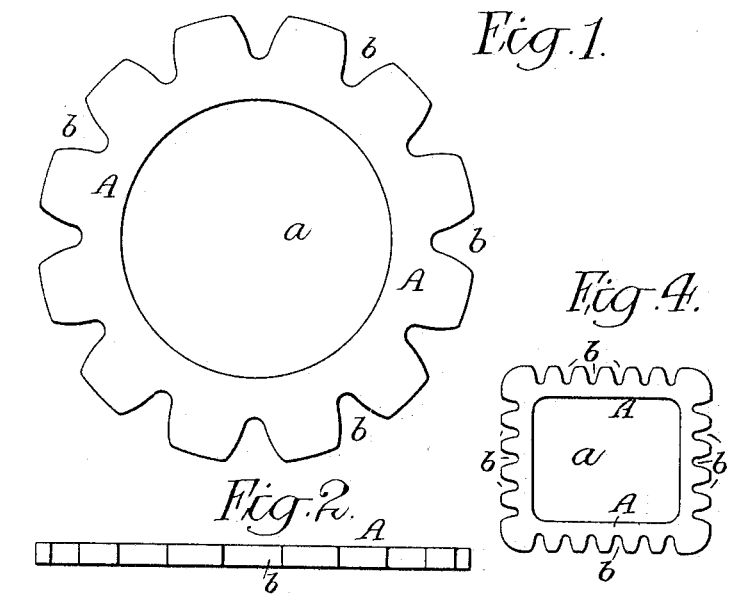
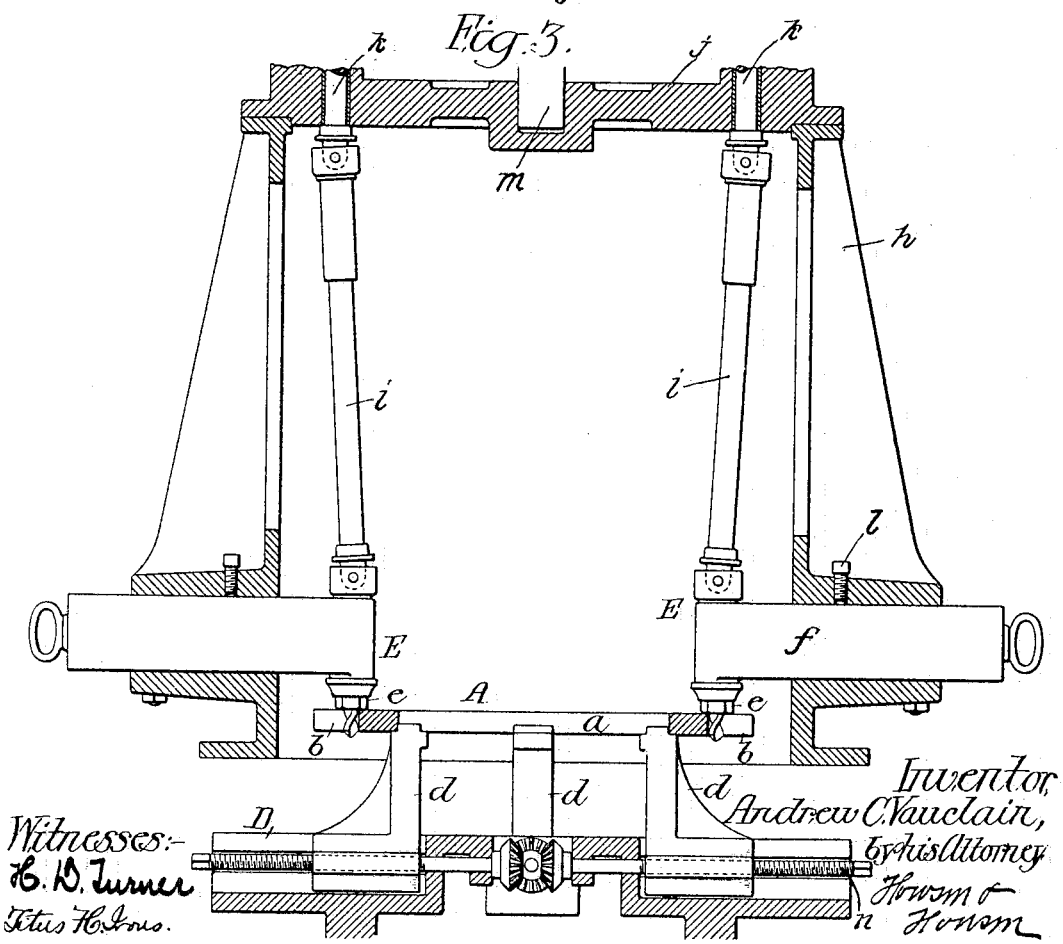

No. 766,748. Patented August 2, 1904.

UNITED STATES PATENT OFFICE.

ANDREW C. VAUCLAIN, OF PHILADELPHIA, PENNSYLVANIA.

TEMPLET FOR DRILLING-MACHINES.

SPECIFICATION forming part of Letters Patent No. 766,748, dated August 2, 1904.

Application filed November 2, 1903. Serial No. 179,622. (No model.)

*To all whom it may concern:*

Be it known that I, ANDREW C. VAUCLAIN, a citizen of the United States, residing in Philadelphia, Pennsylvania, have invented certain Improvements in Templets for Drilling-Machines, of which the following is a specification.

The object of my invention is to provide a suitable templet which can be used to quickly and accurately aline the drills of a multiple drilling-machine. This object I attain in the following manner, reference being had to the accompanying drawings, in which—

Figure 1 is a plan view of my improved templet. Fig. 2 is an edge view. Fig. 3 is a sectional view showing the templet applied to one form of drilling-machine, and Fig. 4 is a view showing a different form of my improved templet.

A is the templet, made circular in form in the present instance and having an open center $a$ with a series of notches $b$ in its periphery. These notches are preferably tapered, and the roots of the notches are arranged to conform to the size of drill to be used, although this is not absolutely necessary. The number of notches depends upon the number of holes to be drilled in an object, and the width of the notch is such as to enable the operator to quickly adjust the drills in position.

In using my improved templet I preferably mount it upon blocks $d$, Fig. 3, which are adjustable upon the table D of the drilling-machine by means of the screw-threaded spindles $n$, on which said blocks are carried. Mounted in slides $f$ above the table are the drill-spindles E, carrying the drills $e$, set-screws $l$ retaining said slides in different positions of adjustment. A gang or series of these drills is arranged in the present instance in a circle, and they are adjustable toward and from the center of the machine. The letter $h$ indicates standards which support a head $j$, in which the driving-shafts $k$ of the drills are journaled, the driving-gears not being shown, said shafts having laterally-movable coupling members $i$, connecting them with the drill-spindles.

When it is desired to drill, for instance, a series of holes in a cylinder or cylinder-head of a steam-engine, a templet is made, as shown in Figs. 1 and 2, having a number of notches corresponding to the number of holes, the notches being properly spaced to agree with the spacing as previously laid out for the holes in the cylinder or cylinder-head. Then the templet is placed upon the sliding blocks and clamped thereto, as said blocks are moved outwardly by the rotation of the screw-threaded spindles $n$, and in the present instance the table is raised so that the templet will be in line with the drills carried by the drill-spindles. Then the drill-spindles are adjusted so that a drill will be mounted in each slot, the drill resting against the root of the slot, the drills not in use remaining clear of the templet. When all the drills are adjusted and the table with the templet is lowered and the templet removed therefrom, the article to be drilled—such as a cylinder-head, for instance—is placed upon the blocks which carried the templet, and as these blocks move in unison toward and from a common center the article to be drilled must necessarily be in proper alinement with the center of the machine and the drills. Consequently accuracy is assured in the drilling. In the machine illustrated the templet is centered by the universal blocks, and these blocks eventually carry, as remarked above, the article to be drilled.

In Fig. 4 I have shown a modification of the templet where a quadrangular object is to be drilled. It will be understood that the templet may be of any form according to the character of the work to be drilled.

My invention can be applied to reaming or tapping machines, as well as to drilling-machines, without departing from the main feature of my invention.

I claim as my invention—

1. As a new article of manufacture, a templet for use in drilling and like machines, having an open center whereby it is adapted to be supported and centered in the drilling-machine, and a series of notches in its periphery for locating a gang of drills, substantially as described.

2. As a new article of manufacture, a templet for use in drilling and like machines, having a series of notches in its periphery of the same size and contour for locating a gang of drills in the drilling-machine, said templet being adapted to be supported and centered in a drilling-machine, substantially as described.

3. As a new article of manufacture, a templet for use in drilling and like machines of circular form and having an open center whereby it is adapted to be supported and centered in the drilling-machine, and having a series of tapered notches in its periphery for locating a gang of drills in the drilling-machine, substantially as described.

4. As a new article of manufacture, a templet for use in drilling and like machines of circular form and having an open center whereby it is adapted to be supported and centered in the drilling-machine and having a series of tapered notches in its periphery of the same size for locating a gang of drills in the drilling-machine, substantially as described.

5. The combination in a drilling-machine, of a table, a clamping device thereon, a templet mounted on said clamping device and having a series of notches in its periphery, of a head, drill-spindles adjustably mounted on a fixed part of the machine and movable toward and from the axis of the head, the table and head being movable in respect to each other so that the templet can be brought opposite the drills and the drills moved into the recess in the templet, substantially as described.

In testimony whereof I have signed my name to this specification in the presence of two subscribing witnesses.

ANDREW C. VAUCLAIN.

Witnesses:
   WILL. A. BARR,
   JOS. H. KLEIN.